United States Patent [19]

Scheuter et al.

[11] Patent Number: 4,775,019

[45] Date of Patent: Oct. 4, 1988

[54] BALANCE, PARTICULARLY A WHEEL LOADING BALANCE

[75] Inventors: Felix Scheuter, Bolligen; Ernst Schindler, Mittelhäusern; Albert Andres, Urtenen, all of Switzerland

[73] Assignee: Haennie & Cie. AG., Jegenstorf, Switzerland

[21] Appl. No.: 1,462

[22] Filed: Jan. 8, 1987

[30] Foreign Application Priority Data

Jan. 9, 1986 [CH] Switzerland .................. 51/86

[51] Int. Cl.[4] .................. G01G 5/04; G01G 19/02
[52] U.S. Cl. .................. 177/208; 177/134
[58] Field of Search .................. 177/208, 134

[56] References Cited

U.S. PATENT DOCUMENTS

| | | | |
|---|---|---|---|
| 1,844,080 | 2/1932 | Troll | 177/208 X |
| 3,164,218 | 1/1965 | McClimon | 177/208 X |
| 3,464,509 | 9/1969 | Gray | 177/208 |
| 3,465,838 | 9/1969 | Kienzle et al. | 177/208 X |
| 3,533,481 | 10/1970 | Paelian | 177/134 |
| 3,658,142 | 4/1972 | Marshall et al. | 177/208 |

Primary Examiner—George H. Miller, Jr.

Attorney, Agent, or Firm—Brady, O'Boyle & Gates

[57] ABSTRACT

The wheel loading balance has a platform (1), of which one side (13) is, by a first pair of tibs (2), supported for horizontal movement on a first lever member (4) while the opposite side (14) is supported for horizontal movement on a second lever member (5) by a second pair of ribs (3). The two lever members (4, 5) are connected to each other pivotally and in such a way as to be secured against mutual displacement by a spring steel plate (33), being rotatably and horizontally movably mounted in a base (6) (38 to 41) at their remote ends (36, 37). One of the two facing ends of the lever members is rigidly connected to a pressure transmitting member (7) while the other is rotatably supported thereon (31,32). The pressure transmitting member (7) loaded by the lever members lies freely on a diaphragm (23) of a pressure force measuring cell (8) which together with a weight indicating pressure gauge and a connecting line (25) forms a component assembly which is exchangeably mounted in the base (6).

The wheel loading balance is easily assembled, is rugged and accurate and its accuracy of measurement is not adversely affected by shocks or vibrations.

16 Claims, 2 Drawing Sheets

BALANCE, PARTICULARLY A WHEEL LOADING BALANCE

The invention relates to a balance, particularly a wheel loading balance.

The features of the invention resolve the problem of providing an easily assembled, rugged and accurate balance, the accuracy of measurement of which is not adversely affected by external influences, particularly pronounced vibrations, to which wheel loading balances are exposed during transport, during the frequent violent setting on the ground and when the wheel of a vehicle is driven onto the balance.

An example of embodiment of the invention is described in greater detail hereinafter with reference to the accompanying drawings, in which.

Figure 1:
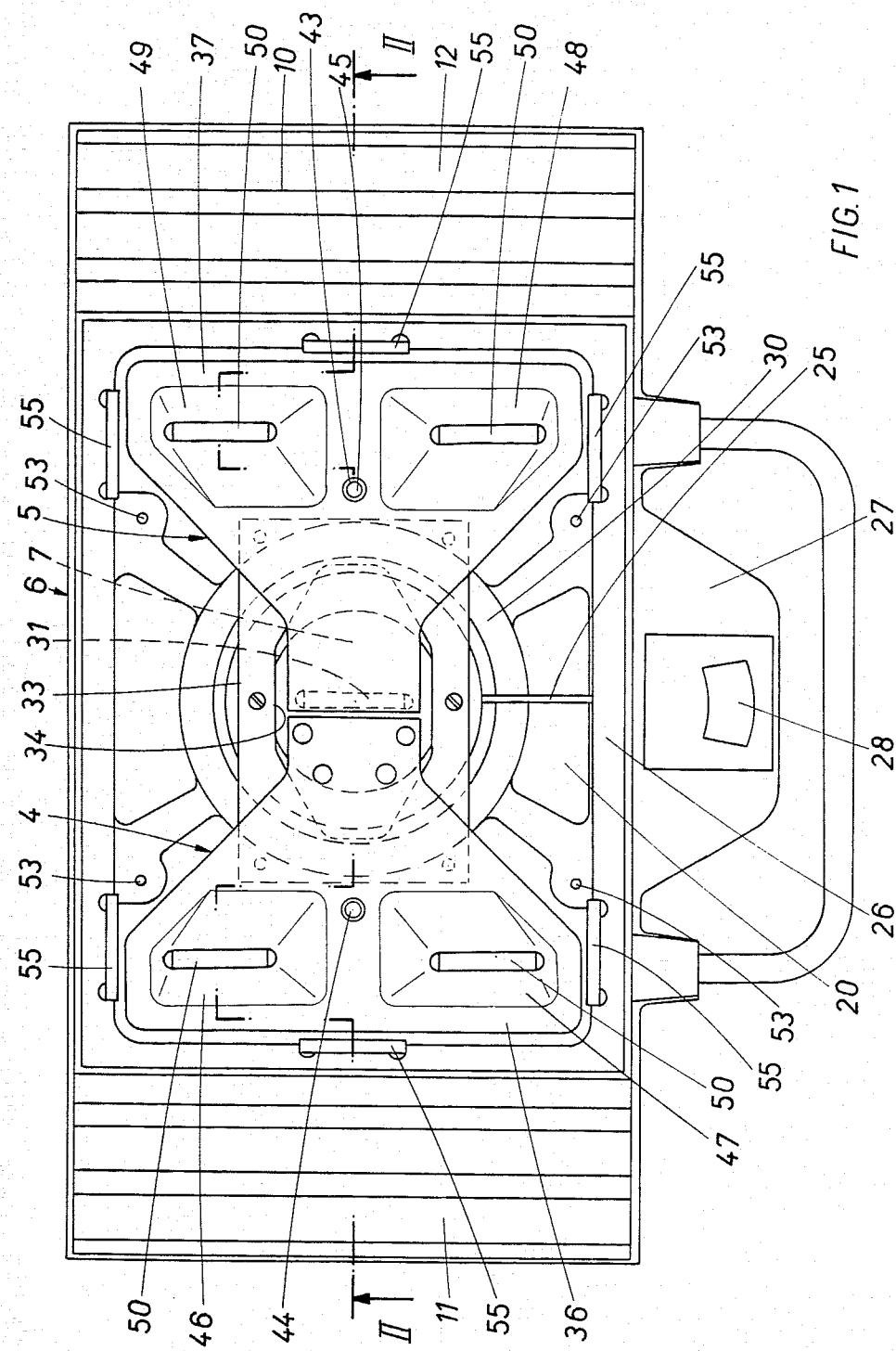
FIG. 1 is a plan view of a wheel loading balance without the platform.

The wheel loading balance shown has a rectangular platform 1 on the (in FIG. 2) left and right-hand sides of which there is in each case a downwardly projecting pair of ribs 2, 3. The first pair of ribs 2 braces the platform 1 on a first lifting member 4, the second pair of ribs 3 on a second lifting member 5. The two lifting members 4, 5 are mounted in a base 6 and act on a pressure force measuring cell 8 through a disc-shaped or piston-shaped pressure transmitting member 7.

The base 6 is in the form of a rectangular shell on the two narrow sides of which there are, provided with an easy-grip surface profile, two ramps 11, 12 for riding the wheel of a vehicle onto and down from the platform 1, the narrow sides 13, 14 of which are angled away from the horizontal weighing surface 15 to the ramp surfaces.

The edge of the platform 1 is connected by a sealing ring 18 of softly elastic material tightly to the upper edge of the shell-shaped part of the base 6 so that the cavity between the platform 1 and the bottom 20 of the base is tightly sealed.

The pressure force measuring cell 8 consists of a shell-like fixed bottom part 22 and a rubber diaphragm 23, the rim of which is pressed tightly on the peripheral edge of the bottom part 22 by a clamping ring 24. The cell 8 is connected by a thin tube (capillary tube) 25 to a pressure gauge (not shown). The pressure gauge is introduced into a hollow projection 27 of the base 6 through an aperture (not visible in the drawing) in the (in FIG. 1) lower side wall 26 of the base 6. The projection 27 comprises a window 28 through which it is possible to see the pressure gauge dial which is calibrated in units of weight. The measuring cell 8 and the pressure gauge connected rigidly to it by the tube 25 constitute one component unit which is exchangeably inserted as one whole assembly into the base 6. The pressure gauge is a bourdon type tubular spring pressure gauge, of which the tubular spring has been filled with fluid prior to being inserted into the base together with the tube 25 and the cell 8. The measuring cell 8 rests freely on the base bottom at a distance within a ring 30 projecting from the surface of the bottom.

Figure 2:
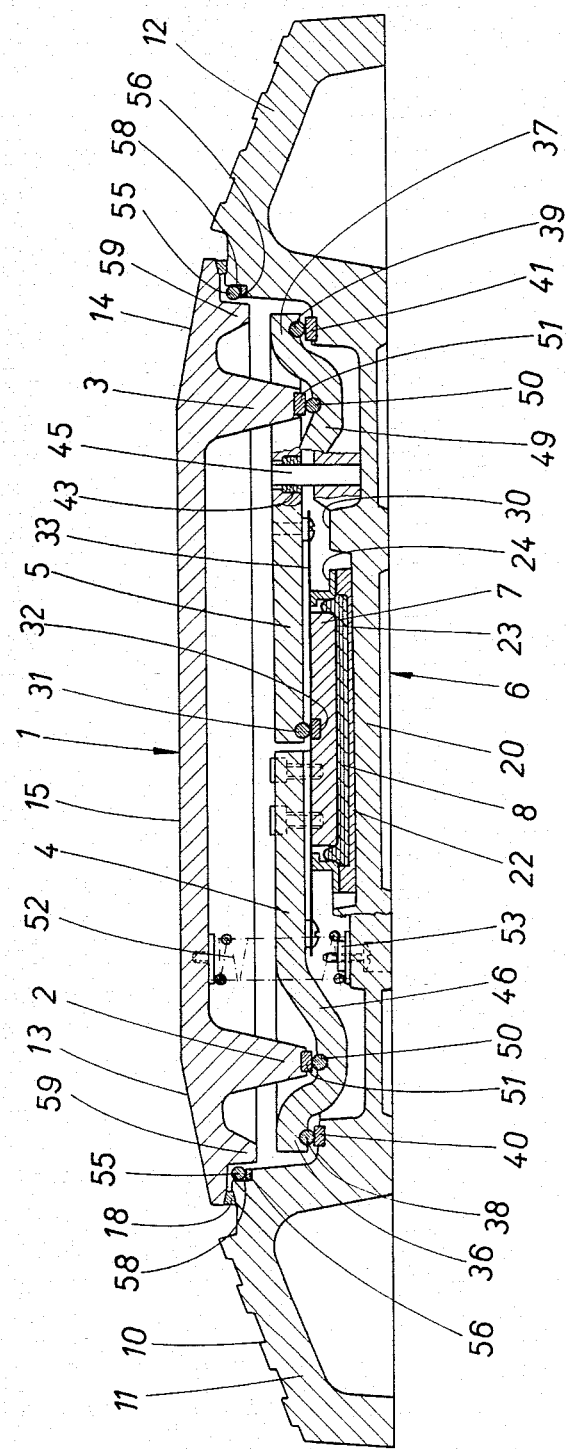
FIG. 2 is a longitudinal section through the balance taken on the line II—II in FIG. 1 and with the platform.

The diaphragm 23 is biased by a circular disc-shaped pressure transmitting member 7 onto which is screwed that end of the lever member 4 which is on the right in FIG. 2. The other lever member 5 is braced on a plain bearing 32 let into the pressure transmitting member 7 through a rolling body 31 which is grooved on the underside of its (in FIG. 2) left-hand end. Both lever members 4 and 5 are connected to each other by a spring steel plate 33 fixed on their undersides and which has a cut-out 34 in the region of the fitment and mounting of the lever members 4 and 5 on the pressure transmitting member 7. The two lever members 4 and 5 are connected to each other pivotally by the spring steel plate 33 on the one hand while on the other they are secured against displacement in respect of each other. The two lever members 4, 5 consist of plates which are widened out towards their mutually remote ends 36, 37, being pivotally mounted for sliding displacement on plain bearings 40, 41 inserted in steps on the side walls of the base through cylindrical rolling bodies 38, 39 which are grooved on their under sides. Each lever member 4, 5 has at its centre of gravity a continuous hole into which protrudes a bolt 44, 45 anchored in the base 6 and carrying an elastic ring 43. The elastic ring 43 has the function of a buffer or a shock absorber which absorbs and damps violent movements of the lever member 4, 5, e.g. when the balance is placed down violently on the ground. The plate-shaped lever members 4, 5 are recessed on the under side at those points at which the pairs of ribs 2, 3 are braced. Slotted into each of the four recesses 46, 47, 48, 49 is a cylindrical rolling body 50 on which are mounted the four ribs of the two pairs of ribs 2, 3 of which each rib is provided with a plain bearing 51. The depth of the recess 46 to 49, the height of the steps comprising the plain bearings 40, 41 and the thickness of the pressure transmitting member 7 are so matched to one another that the bearing surfaces of the plain bearings 32, 40, 41 and 51 lie in one plane when there is no loading on the balance.

To secure the platform 1 on the base 6, four draw springs 52 are provided, of which FIG. 2 shows only one, the attachment point of the springs on the base bottom being shown diazgrammatically in FIG. 1 and designated 53. The spring constants of the draw springs 52 are such that their influence on the weighing process is negligibly small.

The horizontal displaceability of the platform 1 is limited by cylindrical rolling bodies 55 which serve as abutments.

All in all, six rolling bodies 55 are provided, of which each is disposed on the narrow sides, two being provided on each of the long sides of the upper edge of the shell-shaped base part. The rolling bodies 55 lie on elastically compressible foam rubber pads 56 disposed in step-shaped recesses in the base rim. The width of the recesses is smaller than the diameter of the rolling bodies 55 and the depth is sufficiently great that the rolling bodies 55 which rest on the pads 56 do not protrude beyond the base edge. Each of the rolling bodies 55 lies freely on the foam rubber pad 56 between the vertical face 58 of the recess in the base edge and the vertical face of a projection 59 formed on the underside of the platform 1.

When a vehicle wheel is driven up the ramp 11 or 12 onto the platform 1 and braked on the platform, the platform is subject not only to the wheel loading but by reason of the braking action it is also exposed initially to a horizontal force component. Thanks to the plain bearings 50, 51 this is not or is only slightly transmitted to the lever members 4, 5 due to bearing friction and produces a horizontal displacement of the platform on the lever members 4, 5 until the projection 59 abuts one of the rolling bodies 55. Since the rolling body 55 is adapted to roll freely between the face 58 of the steplike recess and the projection 59, the platform 1 can in this abutted position, with no sliding friction, move downwardly just by overcoming the negligibly small rolling friction of the rolling body 55 and the likewise negligibly small spring force of the pad 56. The thickness of the pad 56 is sufficiently great than even with a rolling of the rolling body 55 corresponding to the maximum possible depression of the platform 1, and which occurs at maximum admissible loading, the pad is still not completely compressed.

Under the load transmitted from the platform 1, the two lever members 4, 5 pivot about the support lines of the rolling bodies 38, 39 on the bearings 40, 41 and move slightly downwardly, the spring steel plate 33 which secures the two lever members 4, 5 against a reciprocal displacement bending slightly, although its bending stress still remains negligibly small. The pressure which the mutually facing lever ends exert on the liquid in the pressure measuring cell 8 through the pressure transmitting member 7 and the diaphragm 23, is indicated by the pressure gauge in units of weight of the loading.

All that is essential to the ruggedness and accuracy of measurement of the balance is the horizontal mobility of the two lever members 4, 5 which is limited only by the pads 43. If the two lever members 4, 5 were to be mounted at their ends 36, 37 on the base through fixed bearings, then by virtue of the inevitable vibration and impacts which occur in transport and when setting up the balance, would in keeping with their relatively considerable weight, exert pronounced shearing forces on the fixed bearings so that the mounting and thus also the measurement would become imprecise. The loose mounting due to the bearings 38 to 41 being constructed as rolling surface joints guarantees, even after the balance has been used for a long time, that the levers can always pivot without friction and accurately about the same pivot axis (rolling bodies 38, 39) at the lever end. By reason of the fact that the elastic rings or pads 43 are located in the centre of gravity of the lever members 4, 5, it is ensured that the lever members 4, 5 do not exert any torque on the spring steel plate 33, the rings 43 and bolts 44, 45 when there is vibration or in the event of shocks.

Furthermore, the simple assembly of the balance is advantageous:

The first thing is for the completely prepared and fluid filled measuring system, comprising the pressure force measuring cell 8 and the pressure gauge connected to it by the tube 25, to be inserted into the base 6 which is equipped with bolts 44, 45, the pressure gauge being introduced through the aperture in the side wall 26 and into the cavity in the projection 27. Then the lever members 4, 5 assembled together with the spring steel plate 33 and the pressure transmitting member 7, are inserted as a second component unit, the bolts 44, 45 with the elastic rings 43 being introduced into the holes at the centre of gravity of the lever members. Finally, the platform is placed in position, the draw springs 52, the rolling bodies 55 and the sealing ring 18 being fitted. During this assembly, there is no need for any connection work on the hydraulic measuring system inside the base nor for any fixing of the lever members on bearings in the base.

We claim:

1. A balance, particularly a wheel loading balance, comprising a platform (1), a first lever member (4) supporting one side (13) of said platform, a second lever member (5) supporting the opposite side (14) of said platform, said first and second lever members (4, 5) having remove ends and facing ends, a base (6) in which the lever members (4, 5) are mounted to rotate about their remote ends (36, 37), said remote ends being mounted for horizontal movement, and, located in the base (6), a single pressure force measuring cell (8) having a diaphragm (23), which is loaded by the facing ends of said first and second lever members (4, 5),
   a pressure transmitting member (7) which rests on said diaphragm (23), said first lever member (4) rigidly connected to said pressure transmitting member (7), said second lever member (5) being rotatably supported (31, 32) on said pressure transmitting member (7),
   said first and second lever members (4, 5) being pivotally connected (33) to one another in such a way as to be secured against reciprocal displacement,
   said first and second lever members (4, 5) and said pressure transmitting member (7) being the components of a unit (4, 5, 7), and said unit (4, 5, 7) being horizontally movable only as a whole with respect to said base (6) and said platform (1).

2. A balance according to claim 1, characterised in that the platform (1) is horizontally movably mounted on the lever members (4, 5) (50, 51).

3. A balance according to claim 1, wherein the mutually remote ends (36, 37) of said first and second lever members (4, 5) are mounted for horizontal movement in the base (6).

4. A balance as set forth in claim 1, including a bendable element (33) connecting said first and lever members (4, 5) to each other against reciprocal displacement.

5. A balance as set forth in claim 4, in which said bendable element (33) comprises a spring steel sheet.

6. A balance as set forth in claim 1, including at least one elastic pad means (43) connected between said unit (4, 5, 7) and said base (6) to limit the horizontal displacement of said unit (4, 5, 7).

7. A balance as set forth in claim 6, wherein each lever member (4, 5), at least approximately in its center of gravity, is engaged by an at least one elastic pad means (43), each said elastic pad means being formed by an elastic ring (43) mounted on a stud (44, 45) anchored in said base (6), and functioning to elastically absorb displacements of said unit (4, 5, 7).

8. A balance as set forth in claim 1, including
   a pressure gauge having a weight scale, a tube (25) connecting said pressure force measuring cell (8) to said pressure gauge, said pressure force measuring cell (8), tube (25) and said pressure gauge forming a component second unit being inserted as a whole into said base (6) and resting freely on the bottom of said base (6) so that the second unit as a whole is exchangeable, said base (6) having a hollow projection (27) provided with a window (28) for said pressure gauge and the weight scale, and a passage connecting said hollow space with the space in the base (6) in which said pressure force measuring cell (8) is disposed accommodating a part of said component second unit.

9. A balance as set forth in claim 1, in which
   said platform (1) being horizontally movably mounted on said lever members (4, 5), a plurality of draw springs (52) securing said platform on said base (6), said draw springs (52) having spring constants such that their influence on the weighing process is negligibly small.

10. A balance according to claim 1, wherein said pressure force measuring cell (8) rests freely on the bottom of said base (6).

11. A balance, particularly a wheel loading balance, comprising a platform (1), a first lever member (4) supporting one side (13) of said platform, a second lever member (5) supporting the opposite side (14) of said platform, a base (6) having a rim, said first and second lever members (4, 5) having remote ends and facing ends and being mounted in said base (6) to rotate about their remote ends (36, 37), and a pressure force measuring cell (8) located in said base (6) which is loaded by the facing ends of said lever members (4, 5), said rim of said base (6) having at each side at least one step-shaped recess, each recess having a vertical recess wall (58) and a recess bottom, an elastically compressible pad (56) mounted on said recess bottom, said platform (1) being horizontally movably mounted on said lever members (4, 5) and having opposite side rims, at least one projection (59) at the underside of each said opposite side rims, said projection (59) having a vertical face which faces said vertical recess wall (58), a rolling body (55) inserted in each of said step-shaped recesses serving as abutment for the limitation of the horizontal mobility of said platform (1), each said rolling body (55) having a diameter which is greater than the width of the recess and being freely disposed on said elastically compressible pad (56) between said vertical face of said projection (59) and said vertical recess wall (58), whereby the platform (1) which has abutted a rolling body (55) can without sliding friction move downwardly just by overcoming the rolling friction of the rolling body (55) and the spring effect of the elastically compressible pad (56).

12. A balance as set forth in claim 11, including a pressure gauge having a weight scale, a tube (25) connecting said pressure force measuring cell (8) to said pressure gauge, said pressure force measuring cell (8), tube (25) and said pressure gauge forming a component unit being inserted as a whole into said base (6) and resting freely on the bottom of said base (6) so that the unit as a whole is exchangeable, said base (6) having a hollow projection (27) provided with a window (28) for said pressure gauge and the weight scale, and a passage connecting said hollow space with the space in the base (6) in which said pressure force measuring cell (8) is disposed accommodating a part of said component unit.

13. A balance as set forth in claim 11, in which a plurality of draw springs (52) securing said platform on said base (6), said draw springs (52) having spring constants such that their influence on the weighing process is negligibly small.

14. A balance, particularly a wheel loading balance, comprising a platform (1), a first lever member (4) supporting one side (13) of said platform, a second lever member (5) supporting the opposite side (14) of said platform, said first and second lever members (4, 5) having remote ends (36, 37) and facing ends, a base (6) in which the lever members (4, 5) are mounted to rotate about their remote ends (36, 37), and a pressure force measuring cell (8) which is loaded by the facing ends of said lever members (4, 5) located in said base (6), said first and second lever members (4, 5) having recesses (46, 47, 48, 49), first bearing means (50) arranged in said recesses, said platform (1) having projections (2, 3) which are provided with second bearing means (51) which are supported on said first bearing means (50) to enable a horizontal displacement of said platform (1) on the lever members (4, 5), said base (6) having steps provided with third bearing means (40, 41), the remote ends (36, 37) of the lever members (4, 5) having first fulcrum means (38, 39) supported on said third bearing means (40, 41), said pressure force measuring cell (8) having a diaphragm (23), a pressure transmitting member (7) resting on said diaphragm (23), a fourth bearing means (32) on said pressure transmitting member (7), said second lever member (5) having second fulcrum means (31) being rotatably supported on said fourth bearing means (32) of the pressure transmitting member (7), the depth of the recesses (46–49), the height of the steps of the base (6), and the thickness of the pressure transmitting member (7) being so matched to one another that the bearing surfaces of said first, second, third and fourth bearing means and said first and second fulcrum means (50, 51, 40, 41, 32, 38, 39, 31) by which said platform (1) is braced on said lever members (4, 5) and these latter are supported on the steps of said base (6) and said pressure transmitting member (7) lie at least approximately in one plane when the balance is not under load.

15. A balance as set forth in claim 14, including a pressure gauge having a weight scale, a tube (25) connecting said pressure force measuring cell (8) to said pressure gauge, said pressure force measuring cell (8), tube (25) and said pressure gauge forming a component unit being inserted as a whole into said base (6) and resting freely on the bottom of said base (6) so that the unit as a whole is exchangeable, said base (6) having a hollow projection (27) provided with a window (28) for said pressure gauge and the weight scale, and a passage connecting said hollow space with the space in the base (6) in which said pressure force measuring cell (8) is disposed accommodating a part of said component unit.

16. A balance as set forth in claim 14, in which said platform (1) being horizontally movably mounted on said lever members (4, 5), a plurality of draw springs (52) securing said platform on said base (6), said draw springs (52) having spring constants such that their influence on the weighing process is negligibly small.

* * * * *